United States Patent
Biebuyck

(10) Patent No.: US 9,101,091 B2
(45) Date of Patent: Aug. 11, 2015

(54) GUIDE SYSTEM FOR THE PLUNGER OF A RECTANGULAR BALER

(71) Applicant: CNH Industrial America LLC, New Holland, PA (US)

(72) Inventor: Ronald Biebuyck, Veurne (BE)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 14/391,829

(22) PCT Filed: Apr. 4, 2013

(86) PCT No.: PCT/EP2013/057110
§ 371 (c)(1),
(2) Date: Oct. 10, 2014

(87) PCT Pub. No.: WO2013/152988
PCT Pub. Date: Oct. 17, 2013

(65) Prior Publication Data
US 2015/0059310 A1 Mar. 5, 2015

(30) Foreign Application Priority Data
Apr. 10, 2012 (BE) ................................ 2012/0241

(51) Int. Cl.
*A01F 15/04* (2006.01)
*B30B 15/04* (2006.01)
*B30B 9/30* (2006.01)
*A01F 15/08* (2006.01)

(52) U.S. Cl.
CPC ............. *A01F 15/042* (2013.01); *A01F 15/046* (2013.01); *A01F 15/08* (2013.01); *B30B 9/3021* (2013.01)

(58) Field of Classification Search
CPC . A01F 15/0841; A01F 15/042; A01F 15/046; A01F 15/04; A01F 15/08; B30B 9/306; B30B 9/3021; B30B 9/3032; B30B 1/266; Y10T 74/2142; Y10T 403/553; Y10T 403/555
USPC .................. 100/178, 179, 240, 245; 56/341
See application file for complete search history.

(56) References Cited

U.S. PATENT DOCUMENTS

| | | | | |
|---|---|---|---|---|
| 2,428,672 A * | 10/1947 | McClellan et al. | ........... | 100/179 |
| 2,991,668 A * | 7/1961 | Keller | .............................. | 408/76 |
| 3,059,569 A | 10/1962 | Nolt | | |
| 3,552,307 A | 1/1971 | Venable | | |
| 4,841,853 A * | 6/1989 | Wallace | ......................... | 100/245 |
| 5,193,453 A * | 3/1993 | Lundy | ............................ | 100/100 |
| 5,642,662 A * | 7/1997 | Schwelling | .................... | 100/245 |
| 6,837,158 B2 * | 1/2005 | Simpson | ........................ | 100/245 |

FOREIGN PATENT DOCUMENTS

| | | |
|---|---|---|
| GB | 813393 | 5/1959 |
| GB | 846396 | 8/1960 |
| GB | 1161650 | 8/1969 |

* cited by examiner

*Primary Examiner* — Jimmy T Nguyen
(74) *Attorney, Agent, or Firm* — Patrick M. Sheldrake; Seyed V. Sharifi T.

(57) ABSTRACT

A rectangular baler having a bale chamber, a compacting plunger and a guide system having at least one guide assembly including a guide element, and a threaded shaft and nut for positioning the guide element, wherein, for receiving said threaded shaft, an elongated slot is provided extending in a slot direction making an angle between 1 and 85 degrees with respect to the discharge direction, the threaded shaft being arranged in an upright position perpendicular to the slot direction.

13 Claims, 7 Drawing Sheets ly guided in the bale chamber using a plurality of guide
GUIDE SYSTEM FOR THE PLUNGER OF A RECTANGULAR BALER This application is the US National Stage filing of International Application Serial No. PCT/EP2013/057110 filed on Apr. 4, 2013 which claims priority to Belgian Application BE2012/0241 filed Apr. 10, 2012, each of which is incorporated herein by reference in its entirety.

TECHNICAL FIELD

The present invention relates to a baler, in particular a rectangular baler comprising a plunger, and a guide system for the plunger.

BACKGROUND ART

In rectangular balers, bales are formed by compressing crop material in a bale chamber by a plunger that reciprocates in the bale chamber. The bale chamber typically comprises a top wall, a bottom wall, and two side walls. At one end of the bale chamber there is provided a plunger. The plunger is typically guided in the bale chamber using a plurality of guide rollers and corresponding guide tracks.

An example of a guide system with a plurality of horizontal and vertical rollers and corresponding tracks is disclosed in U.S. Pat. No. 3,059,569 in the name of the Applicant. The vertical rollers, i.e. the rollers with a vertical axis may be adjustable. Each vertical roller is carried on a vertical stud which passes through a slot in a bracket of the plunger. The slot extends in a direction transverse to the bale chamber, and provides a means whereby the roller can be adjusted toward and away from a track member. A problem with such a guide system is that due to the increasing desired density of the bales, increased high forces are exerted on the vertical rollers during a compression stroke. The studs carrying the vertical rollers may be pushed inward in the slot, resulting in misalignment and damage of the guide system.

Another example of a guide system is disclosed in GB 1,161,650. This guide system uses a plurality of guide rollers having an axis making an angle of 45 degrees with respect to a horizontal plane. The guide tracks are arranged in the corners, along the longitudinal edges of the bale chamber. Also in such an embodiment the reaction forces exerted on the rollers during the compression stroke may be high and may lead to problems.

SUMMARY

The object of embodiments of the invention is to provide a baler which addresses the above mentioned problems, and in particular to provide a baler with an improved adjustable guide system.

According to an aspect of the invention there is provided a rectangular baler comprising a bale chamber adapted to contain one or more bales; a compacting plunger adapted for reciprocating in the bale chamber to advance crop material in a discharge direction towards a discharge opening of the bale chamber; and a guide system adapted for guiding the reciprocating of the plunger in the bale chamber. The guide system comprises at least one guide assembly including a guide element and a threaded shaft and nut for positioning the guide element. Further, there is provided an elongated slot for receiving said threaded shaft. The elongated slot extends in a slot direction making an angle between 1 and 85 degrees with respect to the discharge direction. The threaded shaft passes through said elongated slot in an upright position, perpendicular to the slot direction. According to a possible embodiment the slot is arranged in a member fixed to the plunger such that the guide element is fixed to the plunger. Alternatively, it is possible to provide the slot in a member fixed to the bale chamber such that the guide element is fixed to the bale chamber.

Because the threaded shaft is in an upright position in the slot, during reciprocating of the plunger, the threaded shaft is pushed through the guide element in a transverse direction, perpendicular to the discharge direction. Compared to the prior art, where the slot is also arranged in the transverse direction, the direction of the elongated slot of the present invention ensures that the reaction forces exerted via the guide element on the threaded shaft during the reciprocating movement of the plunger can be dealt with in an improved way whilst maintaining the possibility to adjust the position of the guide element in the transverse direction. More in particular, the critical forces for moving the threaded shaft in the elongated slot will be much larger compared to the guide systems of the prior art, where the slot is arranged in a direction transverse of the discharge direction.

According to a preferred embodiment, the angle between the slot direction and the discharge direction is between 2 and 70, more preferably 5 and 45 degrees, and most preferably between 5 and 25 degrees. Typically the angle will be chosen in function of the required adjustment, the available space, and the reaction forces during operation.

According to a preferred embodiment, the slot is arranged in a member fixed to the plunger. More preferably, the slot is arranged in a horizontal plate fixed in a wall of the plunger, wherein the threaded shaft extends vertically through said slot. Especially when the guide elements are rollers, such an embodiment has the advantage that the rollers can be mounted such that the axis extends vertically, wherein the roller is guided against a vertical plane of a member of the bale chamber. However, according to an alternative embodiment, the elongated slots can also be arranged in a plate making an angle with the horizontal plane. Such an embodiment can for example be used in the baler of GB 1,161,650 discussed in the background section, see also the embodiments of FIGS. 7A and 7B which will be discussed below.

According to a preferred embodiment the guide element is a roller. According to alternative embodiments, the guide element could also be a friction block in a material with a low friction coefficient.

According to a preferred embodiment, the guide element is a roller which is mounted rotatably around the threaded shaft. Such an embodiment has the advantage of being very compact, and of not requiring an additional mounting plate for the roller.

According to an alternative embodiment, the guide assembly comprises a mounting plate on which the guide element is mounted. The threaded shaft is then arranged at the distance of the guide element and passes through the mounting plate for fixing the mounting plate, typically to a member of the plunger. The mounting plate may for example be fixed to a horizontal plate fixed in a recess of the plunger. The slot can be provided either in the mounting plate or in said horizontal plate. In such an embodiment it is preferred to provide two threaded shafts for fixing the mounting plate to the plunger. In that case, two corresponding slots should be provided in the mounting plate or in one or more horizontal plates fixed to the plunger.

According to a preferred embodiment, the compacting plunger has a first side wall and a second side wall, and the at least one guide assembly comprises a first guide assembly arranged at said first side wall, and a second guide assembly arranged at said second guide wall.

According to a further developed embodiment, said guide system further comprises a plurality of horizontal rollers fixed to sidewalls of the plunger. Each horizontal roller has a horizontal rotation axis and is guided in a longitudinal track that is arranged against a side wall of the bale chamber and that extends in the discharge direction.

BRIEF DESCRIPTION OF THE FIGURES

The accompanying drawings are used to illustrate presently preferred non-limiting exemplary embodiments of the present invention. The above and other advantages, features and objects of the invention will become more apparent and the invention will be better understood from the following detailed description when read in conjunction with the accompanying drawings in which:

FIGS. 1, 2, 2A, 3, 3A, 4 and 5 illustrate a part of an embodiment of a baler of the invention. Only the parts relevant for understanding the present invention are illustrated. Other parts of the baler which are well known to the skilled person, such as the pre-compression chamber, the needle assembly, the knotter devices, the end part of the bale chamber with ejection system, etc. have been omitted. In the bale chamber 101 there is arranged a compacting plunger 103 which reciprocates between two side walls 106, 107. The bale chamber 101 has an inlet opening (not shown, below the plunger 103) and a discharge opening (not shown, at the end of the bale chamber in the discharge direction P). In operation, the compacting plunger 103 moves from a retracted position to an extended position in the direction of arrow P to advance bales towards the discharge opening. It will be understood that the bale chamber 101 extends further along the direction P of longitudinal movement of the plunger 103, in the usual manner of arranging a bale chamber and plunger.

Figure 1:
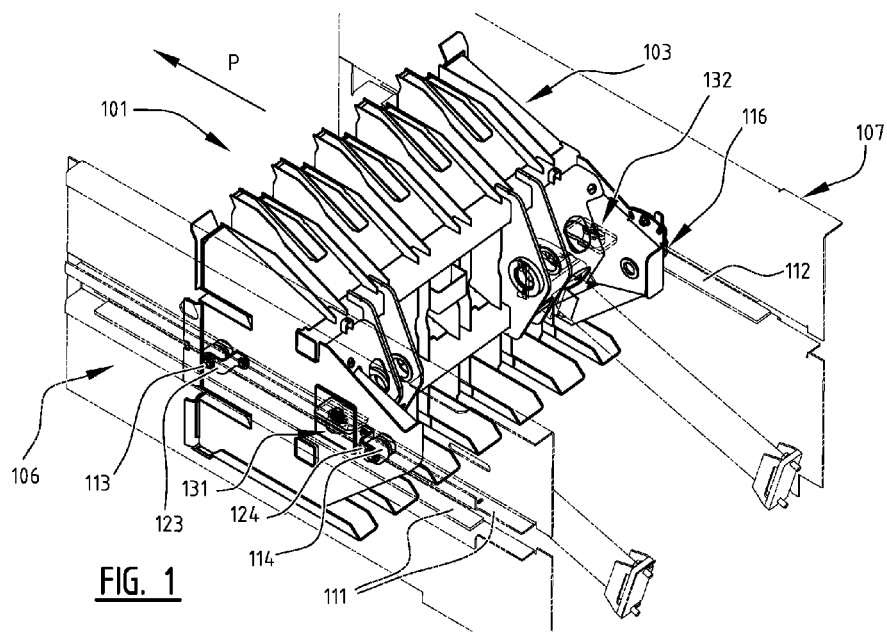
FIG. 1 is a schematic perspective view of an embodiment of a plunger with guide system in a baler according to the invention.

To guide the plunger 103 in the bale chamber 101, and to support it vertically in the bale chamber, horizontally extending guide tracks 111, 112 are affixed as a part of the bale chamber 101. The guide tracks 111, 112 support a first set of rollers 113, 114 at a first side 106 of the bale chamber, and a second set of rollers 115, 116 at the second side 107 of the bale chamber, respectively. The rollers 113-116 are suitably attached to the plunger 103, using in the illustrated embodiment brackets 123-126. The rollers 113-116 are in rolling contact with the guides 111, 112. The rollers 113-116 have a horizontal rotation axis and the guide tracks 111, 112 have guide surfaces which extend in a horizontal plane.

Figure 2:
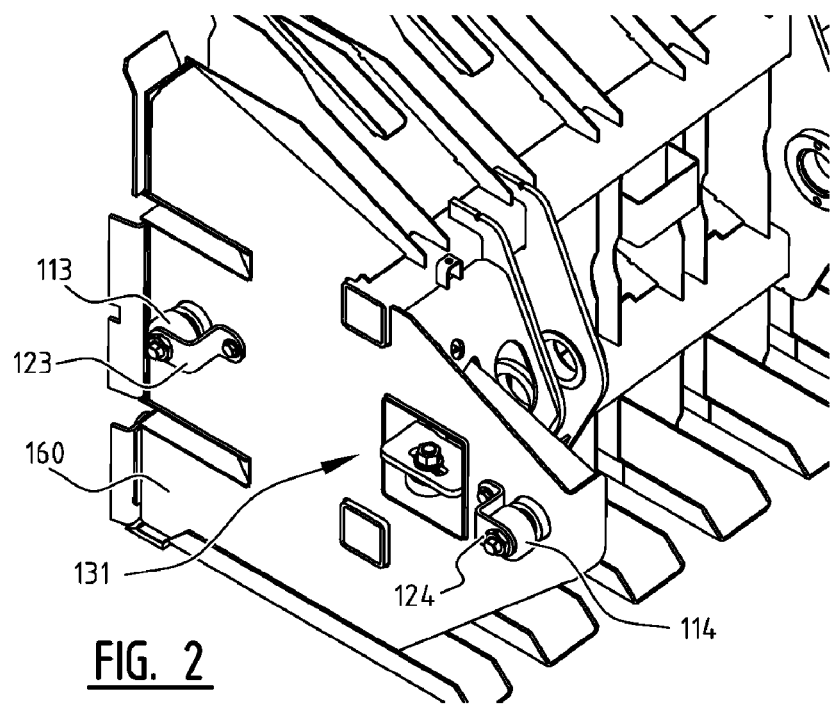
FIG. 2 is the same schematic perspective view of FIG. 1, wherein the sides with the tracks have been omitted to better illustrated a side of the plunger.
Figure 2A:
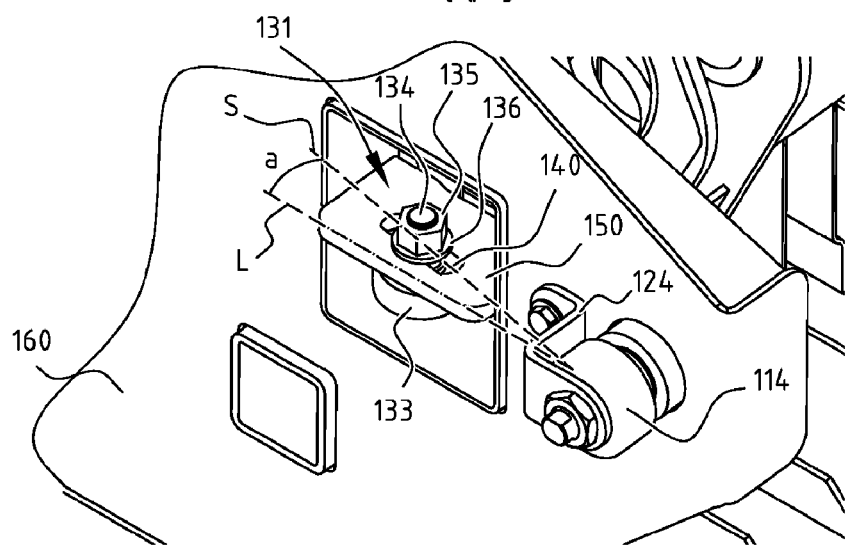
FIG. 2A is a detailed perspective view of a part of FIG. 2.
Figure 3:
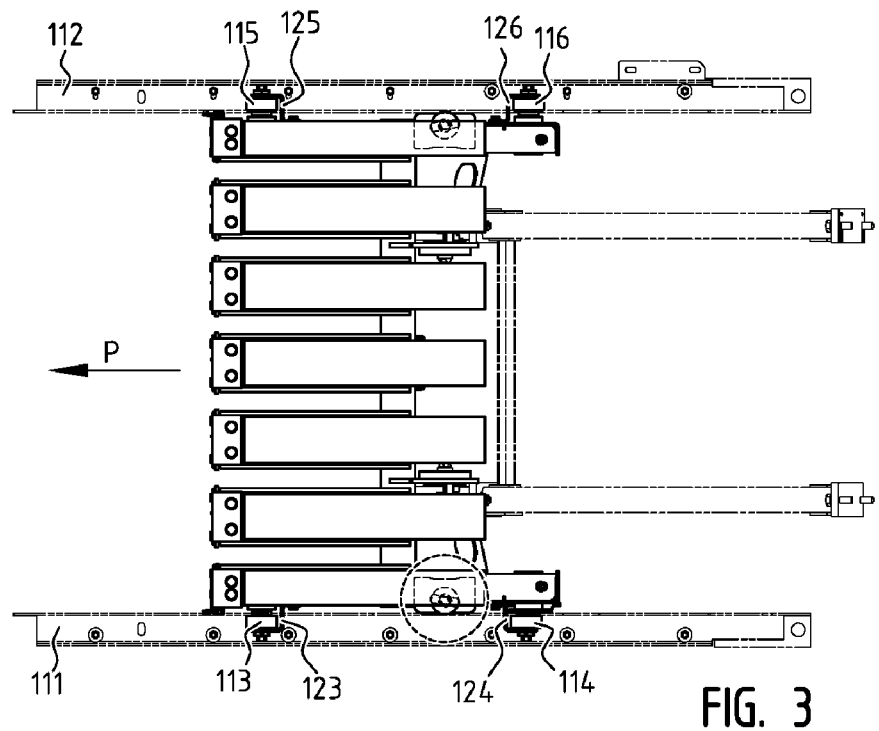
FIG. 3 is a schematic bottom view of a plunger with guide system of FIG. 1.
Figure 3A:
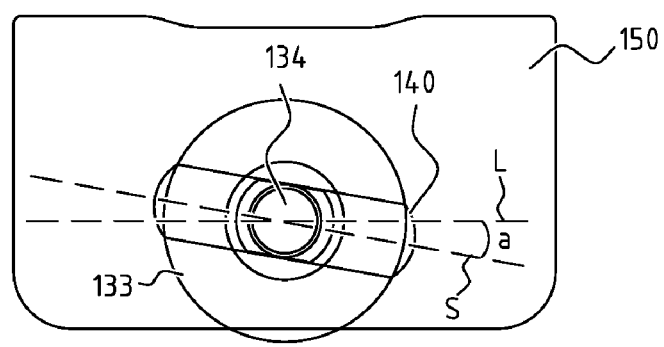
FIG. 3A is a detailed view of a part of FIG. 3.
Figure 4:
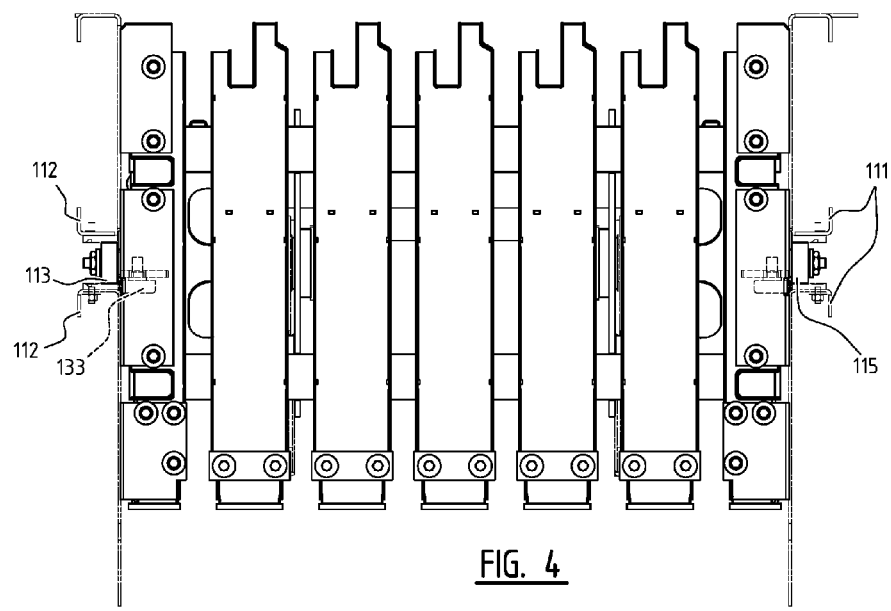
FIG. 4 is a view looking to the plunger looking from the in inside of the bale chamber of the embodiment of FIG. 1.

The guide system further comprises guide assemblies 131, 132. The guide assembly 131 is best visible in FIGS. 2 and 2A. The guide assembly 131 comprises a guide element in the form of a roller 133 having a vertical rotation axis. The guide assembly 131 further comprises a vertical threaded shaft 134 and a nut 135 for fixing the roller 133 to the plunger 103. The roller 133 is rotatably connected with the threaded shaft 134. The threaded shaft 134 is fixed in a slot 140, using a nut 135 and fixation ring 136. The elongated slot 140 extends in a slot direction S which makes an angle a with respect to the longitudinal direction L of the bale chamber. In prior art embodiments this angle is 90 degrees in order to allow the adjustment of the roller 133 in a direction transverse to the longitudinal direction L of the bale chamber. According to embodiments of the invention this angle is chosen between 2 and 70 degrees in order to allow on the one hand a vertical adjustment, and on the other hand to support reaction forces during the reciprocating of the plunger 103 in an improved manner. The angle is preferably between 5 and 45 degrees, and more preferably between 5 and 25 degrees. In the illustrated embodiment the angle a is between 10 and 25 degrees. In the illustrated embodiment the slot is arranged in a horizontal plate 150 fixed in a wall 160 of the plunger 103. The horizontal plate 150 may e.g. be welded in a recess in the wall 160.

Figure 5:
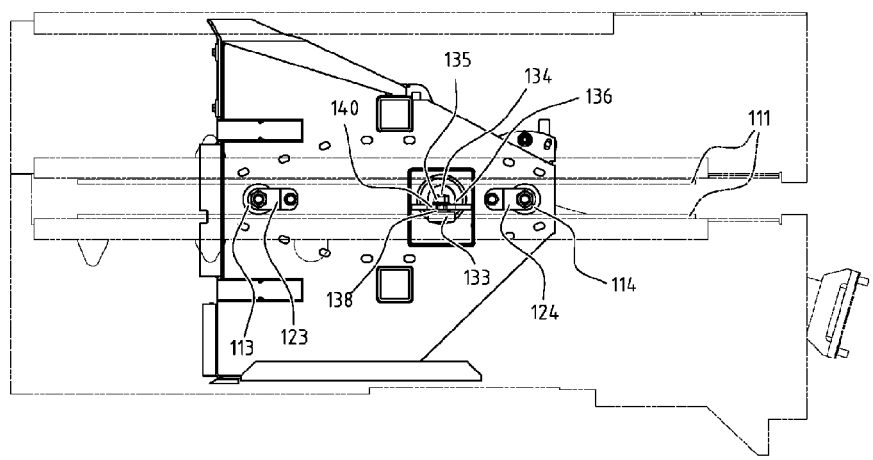
FIG. 5 is a side view of the plunger in the bale chamber according to the embodiment of FIG. 1.

According to a preferred embodiment, the guide assemblies 131, 132 are symmetrical to each other, allowing an adjustment in a direction transverse to the longitudinal direction L of the bale chamber at both sides 106, 107 of the plunger 103. As best shown in FIG. 5, the width dimensions of the slot 140 are slightly bigger than the diameter of the threaded shaft 134 in order for the threaded shaft 134 to be able to pass freely through the slot 140. Further, the roller 133 has a shaft part 138 with a diameter which is larger than the width of the slot 140. This shaft part 138 is fixed against the horizontal plate 150 such that the wheel of the roller is located at a distance of the horizontal plate 150.

Figure 6A:
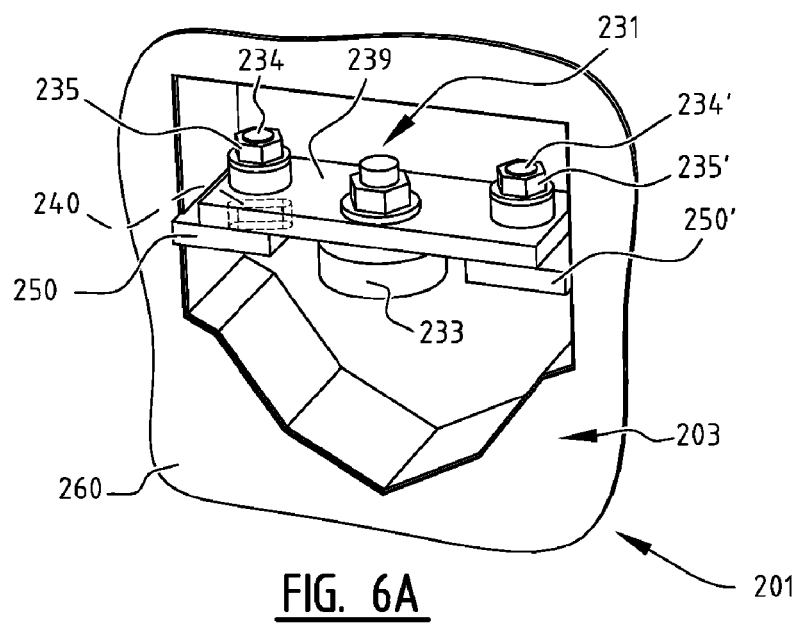
FIGS. 6A and 6B illustrate schematic perspective views of a variant of the guide assembly 131 used in the embodiment of FIGS. 1-5.
Figure 6B:
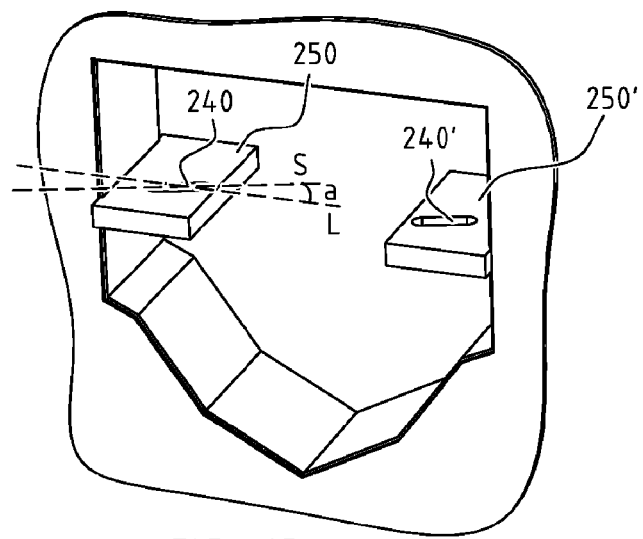

FIGS. 6A and 6B illustrate another possible embodiment of a guide assembly comprising a roller 233 and a threaded shaft 234 with nut 235 to fix the roller 233. In the illustrated embodiment of FIGS. 6A and 6B, the roller 233 is mounted on a mounting plate 239 in a traditional manner, wherein the axis of the roller extends perpendicular to the mounting plate 239. The wall 260 of the plunger is provided with a recess in which a first horizontal plate 250 is fixed. The plate 250 is provided with a slot 240. The slot 240 extends in a slot direction S, which makes an angle a with the longitudinal direction L of the bale chamber, see FIG. 6B. The threaded shaft 234 and nut 235 fix the mounting plate 239 with roller 233 on the horizontal plate 250. The slot 240 allows for the adjustment of the position of the roller 233 in a direction transverse of the longitudinal direction of the bale chamber 201. As illustrated, preferably, two horizontal plates 250, 250' are fixed in the recess of the plunger wall 260. The plate 250' is also provided with a slot 240' which is arranged at the same location as the slot 240 in horizontal plate 250, see FIG. 6B. A second threaded shaft 234' with nut 235' connects the mounting plate 239 to the horizontal plate 250'.

The skilled person will understand that still other embodiments are possible using the principle of the invention. Instead of arranging the slots 240, 240' in the horizontal plates 250, 250', respectively, the slots 240, 240' could also be arranged in the mounting plate 239. Further, instead of welding the horizontal plate 150 of the first embodiment in the recess of the plunger wall 160, the horizontal plate 150 could also be fixed in the recess using bolts.

Figure 7A:
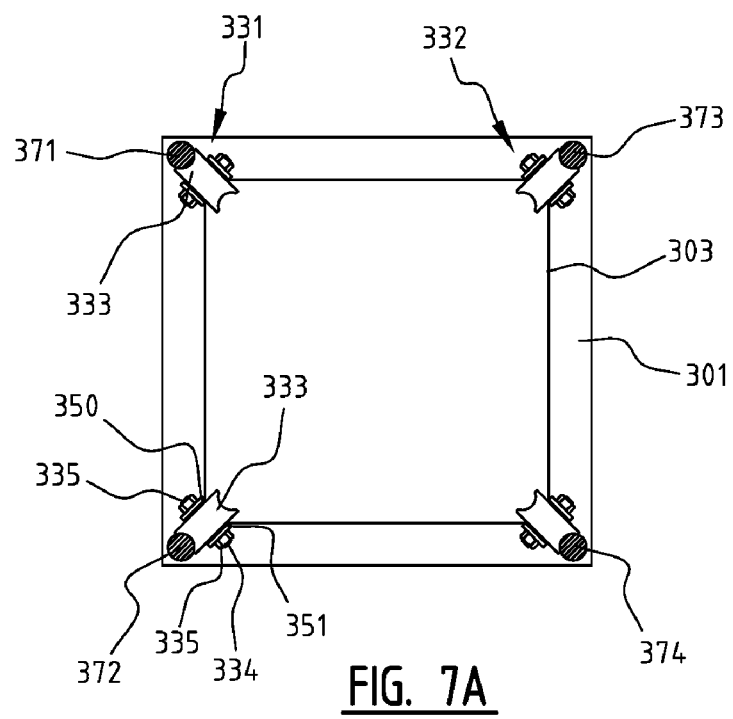
FIG. 7A illustrates schematically another embodiment of a plunger with guide system in a bale chamber according to the invention.
Figure 7B:
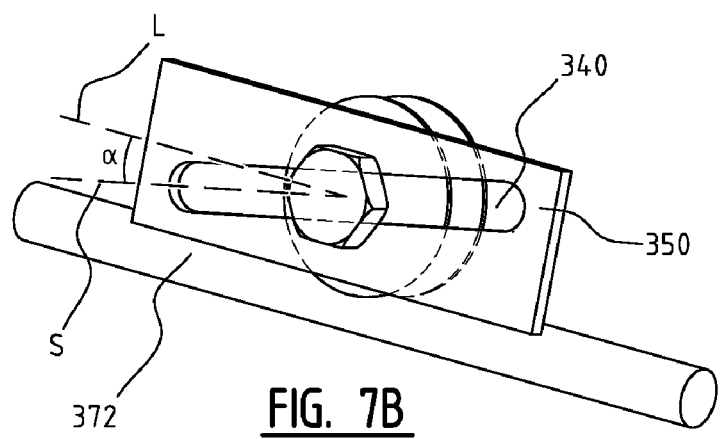
FIG. 7B is a schematic perspective view of a detail of the embodiment of FIG. 4A illustrating a roller mounted in a slot.

Now a third embodiment of a baler according to the invention will be disclosed with reference to FIGS. 7A en 7B. In this embodiment four guide tracks 371-374 are provided along the four edges of the bale chamber 301. Rollers 333 are inclined under an angle of 45 degrees with respect to the horizontal plane. Each roller 333 is mounted between inclined plates 350, 351 which are fixed to the plunger 303. As shown in FIG. 7B, each plate 350, 351 is provided with a slot 340. The slot extends in a slot direction S which makes an angle a with the longitudinal direction L of the bale chamber 301. This angle may be between 2 and 70 degrees. This is best shown in FIG. 7A, where a common vertical threaded shaft 334 extends through the roller 333 perpendicular to the plates 350, 351. The roller 333 is fixed by screwing nuts 335 on the end parts of the threaded shaft 334. According to an alternative embodiment, there could be provided separate threaded shafts 334 instead of a common threaded shaft. The slots 340 will allow the roller 333 to be adjusted toward and away from the longitudinal edges of the bale chamber 301, whilst being able to withstand high reaction forces.

While the principles of the invention have been set out above in connection with specific embodiments, it is to be understood that this description is merely made by way of example and not as a limitation of the scope of protection, which is determined by the appended claims.

The invention claimed is:

1. A rectangular baler comprising:
a bale chamber;
a compacting plunger that reciprocates in the bale chamber to advance crop material in a discharge direction towards a discharge opening of the bale chamber;
a guide system that guides the plunger in the bale chamber, said guide system comprising at least one guide assembly, each guide assembly including a guide element; and a threaded shaft and nut that positions the guide element; and
an elongated slot is arranged in a horizontal member of the compacting plunger, said elongated slot extends in a slot direction at an angle between 1 and 85 degrees with respect to the discharge direction, said thread shaft being arranged in an upright position perpendicular to the slot direction.

2. The rectangular baler of claim 1, wherein the angle is selected from a range between 2 and 70.

3. The rectangular baler of claim 1, wherein said elongated slot is arranged in the member fixed to the plunger.

4. The rectangular baler of claim 1, wherein said threaded shaft is arranged vertically and said slot is arranged in the member fixed in a wall of the plunger, and wherein said member is a horizontal plate.

5. The rectangular baler of claim 1, wherein said elongated slot is arranged in the member of the compacting plunger making an angle with a horizontal plane, and said threaded shaft is arranged in an upright inclined position with respect to the horizontal plane, and wherein the member is a plate.

6. The rectangular baler of claim 1, wherein the guide element is a roller.

7. The rectangular baler of claim 6, wherein said roller is mounted rotatably around said threaded shaft.

8. The rectangular baler of claim 1, wherein said guide assembly comprises a mounting plate on which said guide element is mounted, and said threaded shaft is arranged at a distance of said guide element through said mounting plate.

9. The rectangular baler of claim 8, wherein said slot is provided in said mounting plate or in the member fixed in a wall of the plunger.

10. The rectangular baler of claim 9, wherein said guide assembly comprises a second threaded shaft and a second nut, wherein, for receiving said second threaded shaft, a second elongated slot is provided extending in a slot direction making an angle between 1 and 85 degrees with respect to the angle of the discharge direction, said second threaded shaft being arranged in an upright position perpendicular to the second elongated slot.

11. The rectangular baler of claim 1, wherein said at least one guide assembly comprises a first guide assembly and a second guide assembly, and said first guide assembly is arranged at a first side of the plunger, and said second guide assembly is arranged at an opposite second side of the plunger.

12. The rectangular baler of claim 1, wherein said guide system further comprises a plurality of horizontal rollers and corresponding horizontal guide tracks, each horizontal roller having a horizontal rotation axis and being fixed to the plunger, and each horizontal track extending in the discharge direction and being fixed to a side wall of the bale chamber.

13. The rectangular baler according to claim 11, wherein the guide system further comprises a first horizontal guide track arranged to a first side of the bale chamber and a second horizontal guide track arranged to an opposite second side of the bale chamber; and wherein said plunger is provided with a first pair of horizontal rollers at a first side thereof and a second pair of horizontal rollers (115, 116) at the second side thereof, said first pair of horizontal rollers being guided and supported in said first horizontal guide track, and a second pair of horizontal rollers being guided and supported in said second horizontal guide track.

* * * * *